US009915380B2

(12) United States Patent
Gardner et al.

(10) Patent No.: US 9,915,380 B2
(45) Date of Patent: Mar. 13, 2018

(54) MULTI-LAYER TUBULAR CONDUIT

(75) Inventors: Scott Gardner, Knoxville, TN (US);
Timothy A. Grimsley, Knoxville, TN (US)

(73) Assignee: Dura-Line Corporation, Knoxville, TN (US)

( * ) Notice: Subject to any disclaimer, the term of this patent is extended or adjusted under 35 U.S.C. 154(b) by 976 days.

(21) Appl. No.: 12/784,225

(22) Filed: May 20, 2010

(65) Prior Publication Data

US 2010/0325861 A1 Dec. 30, 2010

Related U.S. Application Data

(60) Provisional application No. 61/221,307, filed on Jun. 29, 2009.

(51) Int. Cl.
*F16L 7/00* (2006.01)
*F16L 59/06* (2006.01)
(Continued)

(52) U.S. Cl.
CPC ................... *F16L 7/00* (2013.01); *F16L 7/02* (2013.01); *F16L 9/147* (2013.01); *F16L 59/06* (2013.01);
(Continued)

(58) Field of Classification Search
CPC ..... F16L 7/00; F16L 7/02; F16L 59/06; F16L 9/147; F16L 57/06; Y10T 29/49428; H02G 1/14; H02G 15/00; H02G 3/0468
(Continued)

(56) References Cited

U.S. PATENT DOCUMENTS 3,097,058 A * 7/1963 Branscum ............. B29C 47/064
215/379
3,808,351 A * 4/1974 Moisson-Franckhauser
............................. H01B 12/16
174/15.5
(Continued)

FOREIGN PATENT DOCUMENTS

DE 102006036720 2/2008

OTHER PUBLICATIONS

Kuhn et al, "Utility Corridor Structures and Other Utility Accomodation Alternatives in TxDOT Right of Way", Sep. 2002, Texas Transportation Institute, pp. 1, 10-11, figs. 2-2 and 2-3, https://pdfs.semanticscholar.org/12c9/
7ea56ef36734955622f2cce7b04b5ec17777.pdf.*
(Continued)

*Primary Examiner* — A. Dexter Tugbang
*Assistant Examiner* — Jeffrey T Carley
(74) *Attorney, Agent, or Firm* — Dentons US LLP; Brian R. McGinley; Roman Tsibulevskiy

(57) ABSTRACT

Methods and devices related to multi-layer tubular conduit are disclosed. The method of making the multi-layer tubular conduit includes providing a hermetically sealed metal tube, inserting a thermoplastic conduit within the tube, and surrounding the exterior of the tube with an overjacket. The multi-layer tubular conduit device includes three layers: a layer of thermaplastic conduit, a layer of hermetically sealed metal tube, and a layer of overjacket. The three layers are arranged coaxially such that they share a common central axis. The method of use includes installing a multi-layer tubular conduit device in a public or non-public environment. The multi-layer tubular conduit offers mechanical protection from harsh and/or hostile environments while still offering the flexibility of traditional conduit.

30 Claims, 4 Drawing Sheets

(51) Int. Cl.
*F16L 7/02* (2006.01)
*H02G 3/04* (2006.01)
*H02G 1/14* (2006.01)
*H02G 15/00* (2006.01)
*F16L 9/147* (2006.01)
*F16L 57/06* (2006.01)

(52) U.S. Cl.
CPC ............ *H02G 1/14* (2013.01); *H02G 3/0468* (2013.01); *H02G 15/00* (2013.01); *F16L 57/06* (2013.01); *Y10T 29/49428* (2015.01); *Y10T 29/49826* (2015.01)

(58) Field of Classification Search
USPC ......... 29/868, 869, 870; 174/21 R, 21 C, 24, 174/28; 138/114, 173, 140, 153
See application file for complete search history.

(56) References Cited

U.S. PATENT DOCUMENTS

| | | | |
|---|---|---|---|
| 4,162,093 A * | 7/1979 | Sigmund | B29C 44/1242 138/114 |
| 4,673,516 A | 6/1987 | Berry | |
| 4,892,442 A | 1/1990 | Shoffner | |
| 5,033,301 A * | 7/1991 | Kistner | B21D 41/026 72/353.4 |
| 5,227,080 A | 7/1993 | Berry | |
| 5,587,181 A | 12/1996 | Owens et al. | |
| 5,865,216 A * | 2/1999 | Youngs | F16L 11/20 138/113 |
| 6,167,180 A * | 12/2000 | Keller | G02B 6/4494 100/104 |
| 6,366,725 B1 * | 4/2002 | Weiss | G02B 6/443 385/100 |
| 2003/0231020 A1 | 12/2003 | Yonezawa | |
| 2004/0151448 A1 * | 8/2004 | Adams | G02B 6/4429 385/113 |
| 2004/0211272 A1 | 10/2004 | Aronstam | |
| 2005/0103518 A1 * | 5/2005 | Glew | G02B 6/4459 174/113 R |
| 2008/0121410 A1 * | 5/2008 | McCall | H02G 3/0481 174/95 |

OTHER PUBLICATIONS

Partial European Search Report dated Apr. 15, 2014 for EP Application No. 14150233.6-1758.

* cited by examiner

MULTI-LAYER TUBULAR CONDUIT

CROSS-REFERENCE TO RELATED APPLICATIONS

This application claims priority pursuant to 35 U.S.C. 119(e) to co-pending U.S. Provisional Patent Application Ser. No. 61/221,307, filed Jun. 29, 2009, the entire disclosure of which is incorporated herein by reference.

FIELD

The present invention relates generally to tubular conduit with characteristics to improve performance in harsh and/or hostile environments, and more particularly, to a multi-layer tubular conduit and methods related thereto.

BACKGROUND

Conduit may be used for protecting and positioning cable. Conduit may be installed in a variety of different environments. Sometimes, environmental factors can compromise the integrity of the conduit and affect the cable and/or a corresponding signal. Environmental factors that can compromise the integrity of conduit may include heat, chemicals, humidity, animals, human influence, etc. In some applications, it is desirable to provide a conduit that includes enhanced resistance to certain types of chemicals and gases, in liquid and/or vapor form. Among other shortcomings, current methods and devices for protecting conduit with corrugated steel fail to provide an airtight seal.

Thus, there exists the need for a conduit with multiple layers to protect the underlying cable from harsh and/or hostile environmental factors.

SUMMARY

According to an illustrative embodiment, a multi-layer tubular conduit, with special protection for harsh environments, and methods related thereto are disclosed herein.

One aspect is directed to a method of making a multi-layer tubular conduit. The method includes providing a hermetically sealed metal tube, inserting a thermoplastic conduit within the hermetically sealed metal tube, and surrounding the exterior of the hermetically sealed metal tube with an overjacket.

Another aspect is directed to a multi-layer tubular conduit. The multi-layer tubular conduit includes a layer of thermaplastic conduit, a layer of hermetically sealed metal tube, and a layer of overjacket. The three layers are arranged coaxially such that they share a common central axis.

Another aspect is directed to a method of using a multi-layer tubular conduit. The method of use includes installing a multi-layer tubular conduit, as described above, in a public or non-public environment.

The multi-layer tubular conduit offers mechanical protection from harsh and/or hostile environments while still offering the flexibility of traditional conduit.

The foregoing and other objects are intended to be illustrative of the invention and are not meant in a limiting sense. Many possible embodiments of the invention may be made and will be readily evident upon a study of the following specification and accompanying drawings comprising a part thereof. Various features and subcombinations of invention may be employed without reference to other features and subcombinations. Other objects and advantages of this invention will become apparent from the following description taken in connection with the accompanying drawings, wherein is set forth by way of illustration and example, an embodiment of this invention and various features thereof.

BRIEF DESCRIPTION OF THE DRAWINGS

A preferred embodiment of the invention, illustrative of the best mode in which the applicant has contemplated applying the principles, is set forth in the following description and is shown in the drawings and is particularly and distinctly pointed out and set forth in the appended claims.

Corresponding reference characters indicate corresponding parts throughout the several views of the drawings.

DETAILED DESCRIPTION

Figure 1:
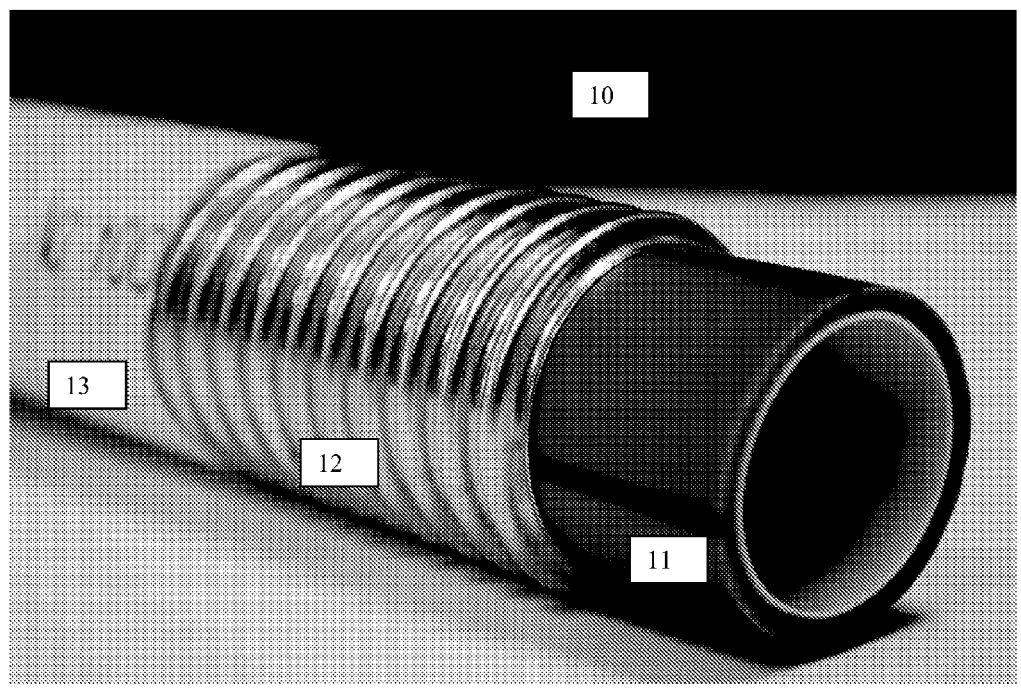
FIG. 1 is a perspective view of a multi-layer tubular conduit.

As required, a detailed description is provided; however, it is to be understood that the disclosed embodiment is merely exemplary of the principles of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Method of Making

One aspect is directed to a method of making a multi-layer tubular conduit. The method includes the steps of providing a hermetically sealed metal tube, inserting a thermoplastic conduit within the tube, and surrounding the exterior of the tube with an overjacket.

Providing a Tube

The step of providing the hermetically sealed metal tube may be accomplished by any known means or by any means to be discovered hereafter. The hermetically sealed metal tube is preferably corrugated and preferably stainless steel. For example, a corrugated, hermetically sealed, stainless steel tube which is available from TITEFLEX CORPORATION—GASTITE DIVISION may be used. In some embodiments, the hermetically sealed metal tube is type 200 series, type 300 series, or type 400 series stainless steel, preferably type 304 (18/8). Other types of stainless steel may be used. In some embodiments, the hermetically sealed metal tube is aluminum, copper, steel or other metal.

The hermetically sealed metal tube provided may have any length. In some embodiments, the hermetically sealed metal tube has a length in the range of 80 feet to 6000 feet, preferably having a length of 5000 feet. In some embodiments, a plurality of hermetically sealed metal tubes are arranged end-to-end, such that an end of one is aligned with an end of another. The plurality of the tubes are orbitally welded together end-to-end. In this manner, a continuous section of hermetically sealed metal tube is formed having any desired length. Any number of hermetically sealed metal tubes can be orbitally welded together end-to-end in this manner.

The hermetically sealed metal tube has an inside diameter in the range of 2 millimeters (about 0.8 inches) to 15 inches (about 381 millimeters). The hermetically sealed metal tube has an outside diameter in the range of 2 millimeters (about 0.8 inches) to 15 inches (about 381 millimeters).

Inserting a Conduit Within the Tube

The step of inserting the thermoplastic conduit within the hermetically sealed metal tube can be accomplished by pushing, pulling or mechanically propelling the thermoplastic conduit into the hermetically sealed metal tube or by wrapping the metal tube around the thermoplastic conduit and welding the metal tube to form a hermetic seal. The thermoplastic conduit is arranged within the hermetically sealed metal tube coaxially such that both share a common central axis. The thermoplastic conduit has an outside diameter that is less than the inside diameter of the corrugated, hermetically sealed tube.

In some embodiments, the thermoplastic conduit is comprised of any one of the following: Polyvinylchloride (PVC), Polyethylene (PE), Polyurethane, Polyvinylidene Fluoride (PVDF), or Nylon. In some embodiments, the thermoplastic conduit is a Polyethylene (PE) conduit comprised of any one of the following: high-density polyethylene (HDPE), medium density polyethylene (MDPE), low density polyethylene (LDPE), riser-rated material, or plenum rated material. In some embodiments, the thermoplastic conduit is comprised of a fire retardant material, such as riser-rated material, plenum-rated material, or Low Smoke Zero Halogen (LSZH). In some embodiments, the thermoplastic conduit includes a layer of friction-reducing material, such as a silicone polymer.

In some embodiments, the thermoplastic conduit has an inside diameter in the range of 2 millimeters (about 0.8 inches) to 15 inches (about 381 millimeters). In some embodiments, the thermoplastic conduit has an outside diameter in the range of 2 millimeters (about 0.8 inches) to 15 inches (about 381 millimeters). In some embodiments, the thermoplastic conduit is colored with a colored dye. In some embodiments, the thermoplastic conduit includes at least one stripe of contrasting color.

Surrounding the Exterior of the Tube with an Overjacket

The step of surrounding the exterior of the tube with an overjacket is accomplished using basic extrusion methods that are otherwise known to those skilled in the art of plastics extrusion. The overjacket has an inside diameter greater than the outside diameter of the hermetically sealed metal tube. In some embodiments, the inside diameter of the overjacket is in the range of 2 millimeters (about 0.08 inches) to 15 inches (about 381 millimeters). In some embodiments, the outside diameter of the overjacket is in the range of 2 millimeters (about 0.08 inches) to 15 inches (about 381 millimeters). In some embodiments, the overjacket has a thickness in the range of 0.05 inches to 0.10 inch, preferably in the range of 0.06 inches to 0.08 inches, more preferably 0.07 inches. In some embodiments, the overjacket is comprised of any one of the following: Polyvinylchloride (PVC), Polyethylene (PE), Polyurethane, or Nylon. In some embodiments, the overjacket is a Polyethylene (PE) overjacket comprised of any one of the following: high-density polyethylene (HDPE), medium density polyethylene (MDPE), or low density polyethylene (LDPE). In some embodiments, the overjacket is comprised of a fire retardant material, such as Low Smoke Zero Halogen (LSZH), riser rated material, or plenum rated material. In some embodiments, the overjacket is comprised of Polyvinylidene Fluoride (PVDF), Low Smoke Zero Halogen (LSZH), riser rated material, plenum rated material, or some other specialty-use material.

Apparatus

Figure 2:
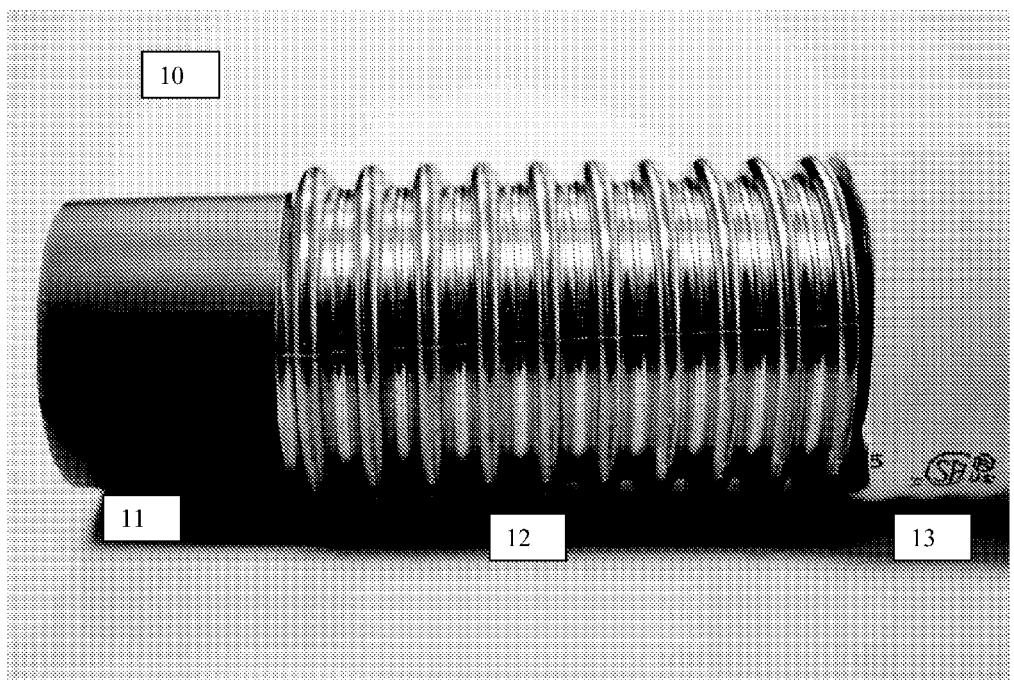
FIG. 2 is another perspective of the multi-layer tubular conduit of FIG. 1.
Figure 3:
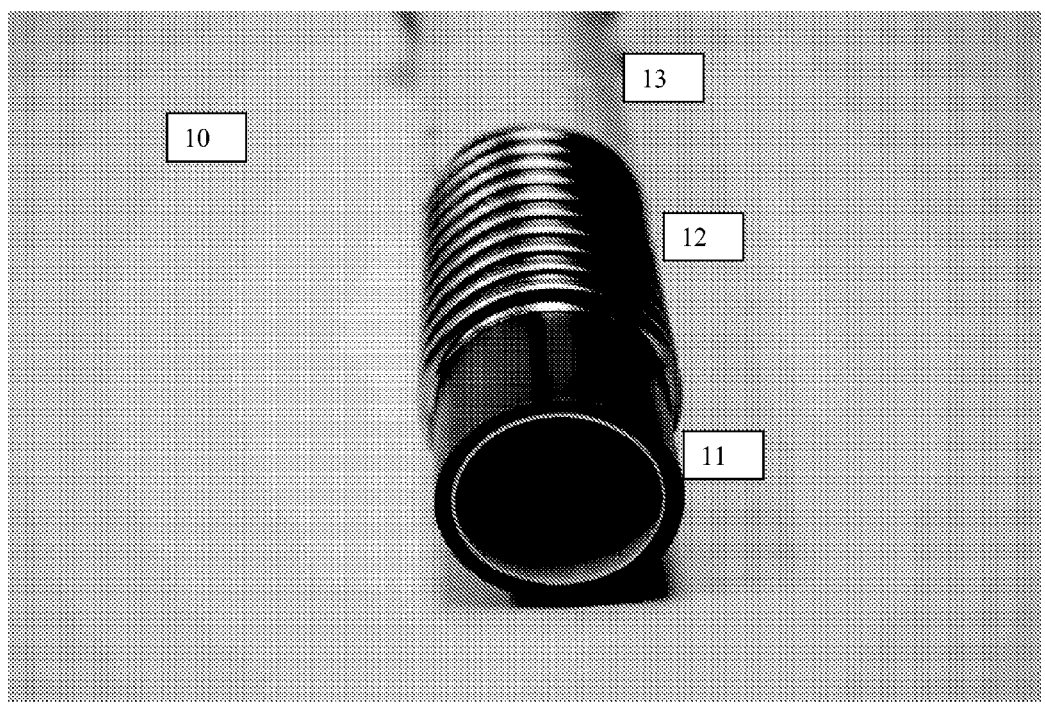
FIG. 3 is another perspective of the multi-layer tubular conduit of FIG. 1.
Figure 4:
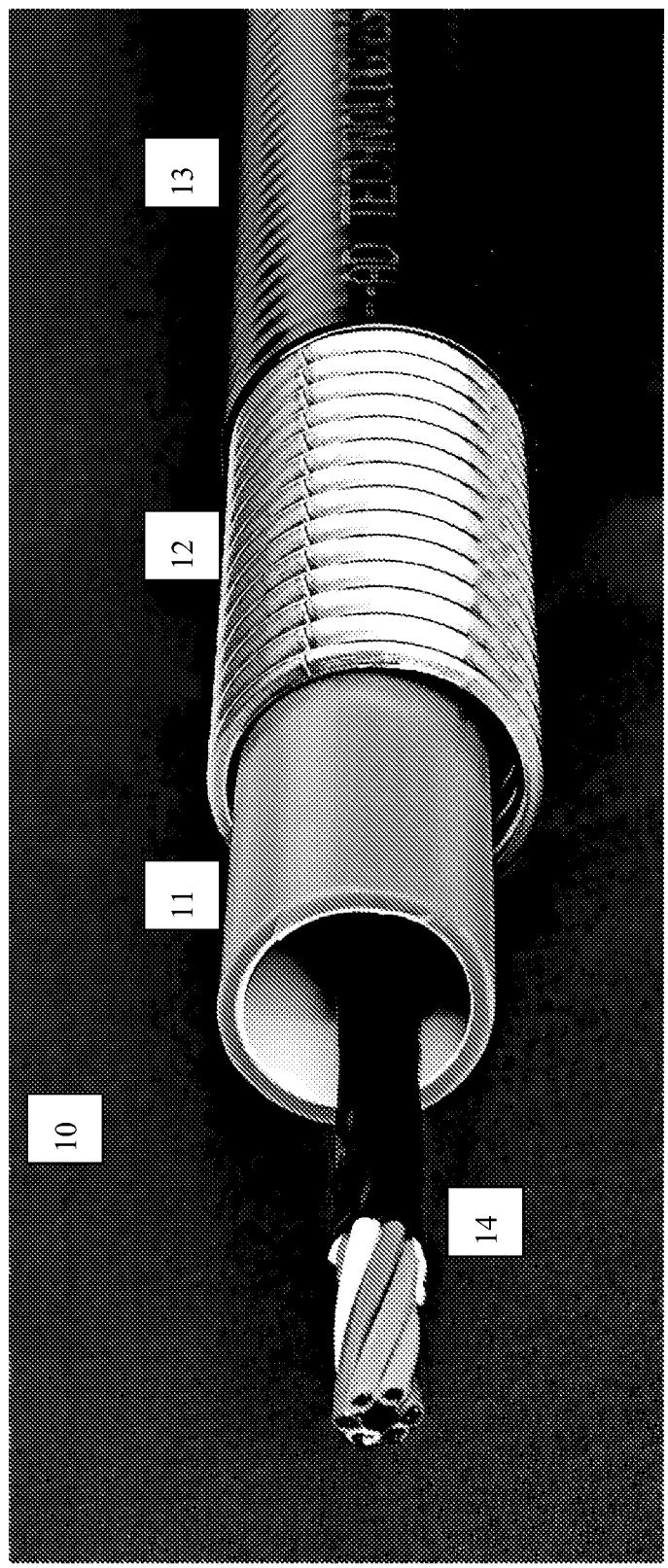
FIG. 4 is a perspective of an exemplary embodiment of the multi-layer tubular conduit.

One aspect is directed to a multi-layer tubular conduit apparatus. Referring to FIG. 1, a perspective view of a multi-layer tubular conduit (10) is shown. FIG. 2 shows another perspective view of the multi-layer tubular conduit (10) shown in FIG. 1. FIG. 3 shows another perspective view of the multi-layer tubular conduit (10) shown in FIGS. 1 and 2. The multi-layer tubular conduit (10) shown in the Figures includes at least three layers. From the inside out, the first (innermost) layer includes a thermaplastic conduit (11). The second (middle) layer includes a hermetically sealed metal tube (12). The third (outermost) layer includes an overjacket (13). The first layer, second layer, and third layer are arranged coaxially such that all share a common central axis. FIG. 4 shows a perspective view of another embodiment of the multi-layer tubular conduit (10). FIG. 4 shows a fiber optic cable (14) extended within the interior of the first (innermost) layer.

First Layer

The first layer includes a thermaplastic conduit (11). The thermoplastic conduit (11) is inserted within the tube (12) coaxially such that they share a common central axis. The thermoplastic conduit (11) has an outside diameter that is less than the inside diameter of the hermetically sealed metal tube (12). In some embodiments, the thermoplastic conduit is comprised of any one of the following: Polyvinylchloride (PVC), Polyethylene (PE), Polyurethane, or Nylon. In some embodiments, the thermoplastic conduit is a Polyethylene (PE) conduit comprised of any one of the following: high-density polyethylene (HDPE), medium density polyethylene (MDPE), or low density polyethylene (LDPE). In some embodiments, the thermoplastic conduit is comprised of a fire retardant material. In some embodiments, the thermoplastic conduit includes a layer of friction-reducing material, such as a silicone polymer.

In some embodiments, the thermoplastic conduit has an inside diameter in the range of 2 millimeters (about 0.08 inches) to 15 inches (about 381 millimeters). In some embodiments, the thermoplastic conduit has an outside diameter in the range of 2 millimeters (about 0.08 inches) to 15 inches (about 381 millimeters). In some embodiments, the thermoplastic conduit is colored with a colored dye. In some embodiments, the thermoplastic conduit includes at least one stripe of contrasting color.

Second Layer

The second layer includes a hermetically sealed metal tube (12). The hermetically sealed metal tube (12) may be provided via any known means or by any means to be discovered hereafter. The hermetically sealed metal tube (12) is preferably corrugated and preferably stainless steel. For example, a corrugated, hermetically sealed, stainless steel tube is available from TITEFLEX CORPORATION—GASTITE DIVISION. In some embodiments, the hermetically sealed metal tube (12) is type 200 series, type 300 series, or type 400 series stainless steel, preferably type 304 (18/8). Other types of stainless steel may be used. In some embodiments, the hermetically sealed metal tube (12) is aluminum, copper, steel or other metal.

The hermetically sealed metal tube (12) may have any length. In some embodiments, the hermetically sealed metal tube (12) has a length in the range of 80 feet to 6000 feet, preferably having a length of 5000 feet. In some embodiments, a plurality of hermetically sealed metal tubes are arranged end-to-end, such that an end of one is aligned with an end of another. The plurality of the tubes are orbitally welded together end-to-end. In this manner, a continuous section of hermetically sealed metal tube is formed having any desired length. Any number of hermetically sealed metal tubes can be orbitally welded together end-to-end in this manner.

The hermetically sealed metal tube (12) has an inside diameter in the range of 2 millimeters (about 0.08 inches) to 15 inches (about 381 millimeters). The hermetically sealed metal tube (12) has an outside diameter in the range of 2 millimeters (about 0.08 inches) to 15 inches (about 381 millimeters).

Third Layer

The third layer includes an overjacket (13) surrounding the exterior of the hermetically sealed metal tube (12). The overjacket (13) has an inside diameter greater than the outside diameter of the hermetically sealed metal tube (12). In some embodiments, the inside diameter of the overjacket (13) is in the range of 2 millimeters (about 0.08 inches) to 15 inches (about 381 millimeters). In some embodiments, the outside diameter of the overjacket is in the range of 2 millimeters (about 0.08 inches) to 15 inches (about 381 millimeters). In some embodiments, the overjacket has a thickness in the range of 0.05 inches to 0.10 inch, preferably in the range of 0.06 inches to 0.08 inches, more preferably 0.07 inches. In some embodiments, the overjacket is comprised of any one of the following: Polyvinylchloride (PVC), Polyethylene (PE), Polyurethane, or Nylon. In some embodiments, the overjacket is a Polyethylene (PE) overjacket comprised of any one of the following: high-density polyethylene (HDPE), medium density polyethylene (MDPE), or low density polyethylene (LDPE). In some embodiments, the overjacket is comprised of a fire retardant material. In some embodiments, overjacket is comprised of Polyvinylidene Fluoride (PVDF), Low Smoke Zero Halogen (LSZH), riser rated material, plenum rated material, or some other specialty-use material.

Method of Use

One aspect is directed to a method of using a multi-layer tubular conduit, such as the multi-layer tubular conduit apparatus described above. The method includes installing a multi-layer tubular conduit apparatus, as described above, in a public or non-public environment.

The multi-layer tubular conduit may be used to provide a hydrogen resistant environment to reduce attenuation in optical fiber cables. It may be used in military applications to provide protection from jet fuel or other caustic materials. It may be used in security applications to provide additional protection against physical penetration by foreign objects. It may be used in steam tunnel or other high temperature applications. It may be used to protect the conduit (and cable) from woodpeckers, gophers, or other animals. It may be used for protection from sharp objects in the ground, such as rock or metal. It could be used in conjunction with a plenum or riser jacket for additional security and/or protection. The multi-layer tubular conduit may be used with other micro-designs, such as FuturePath MicroDucts, available from Dura-Line Corporation.

In the foregoing description, certain terms have been used for brevity, clearness and understanding; but no unnecessary limitations are to be implied therefrom beyond the requirements of the prior art, because such terms are used for descriptive purposes and are intended to be broadly construed. Moreover, the description and illustration of the invention is by way of example, and the scope of the invention is not limited to the exact details shown or described.

Although the foregoing detailed description of the present invention has been described by reference to an exemplary embodiment, and the best mode contemplated for carrying out the present invention has been shown and described, it will be understood that certain changes, modification or variations may be made in embodying the above invention, and in the construction thereof, other than those specifically set forth herein, may be achieved by those skilled in the art without departing from the spirit and scope of the invention, and that such changes, modification or variations are to be considered as being within the overall scope of the present invention. Therefore, it is contemplated to cover the present invention and any and all changes, modifications, variations, or equivalents that fall with in the true spirit and scope of the underlying principles disclosed and claimed herein. Consequently, the scope of the present invention is intended to be limited only by the attached claims, all matter contained in the above description and shown in the accompanying drawings shall be interpreted as illustrative and not in a limiting sense.

Having now described the features, discoveries and principles of the invention, the manner in which the invention is constructed and used, the characteristics of the construction, and advantageous, new and useful results obtained; the new and useful structures, devices, elements, arrangements, parts and combinations, are set forth in the appended claims.

It is also to be understood that the following claims are intended to cover all of the generic and specific features of the invention herein described, and all statements of the scope of the invention which, as a matter of language, might be said to fall therebetween.

What is claimed is:

1. A method of making a multi-layer tubular conduit, the method comprising:
    accessing a metal tube having an inside diameter, an outermost diameter, a hermetically sealed length, an interior, and an exterior, wherein the exterior is longitudinally corrugated along the hermetically sealed length, wherein accessing comprises accessing a plurality of individual metal tubes, and orbitally welding together the individual metal tubes end-to-end such that the metal tube is formed;
    positioning a thermoplastic conduit within the interior of the metal tube such that there are no intervening layers between the interior of the metal tube and the thermoplastic conduit, wherein the thermoplastic conduit having an inside diameter and an outside diameter less than the inside diameter of the metal tube, wherein the thermoplastic conduit is hollow;
    routing a signal cable within the thermoplastic conduit longitudinally such that the thermoplastic conduit contains only one bundle including the signal cable; and
    surrounding the exterior of the metal tube with an overjacket such that the thermoplastic conduit, the metal tube, and the overjacket are coaxial to each other and such that there are no intervening layers between the exterior of the metal tube and the overjacket, wherein the overjacket having an outside diameter and an innermost diameter greater than the outermost diameter of the metal tube.

2. The method of claim 1, wherein the metal tube includes a stainless steel, wherein the exterior that is longitudinally corrugated includes the stainless steel.

3. The method of claim 1, wherein the thermoplastic conduit includes at least one of one of a Polyvinylchloride (PVC), a Polyethylene (PE), a Polyurethane, or a Nylon engaging the metal tube.

4. The method of claim 1, wherein the thermoplastic conduit includes a Polyethylene (PE) conduit including at least one of a high-density polyethylene (HDPE), a medium density polyethylene (MDPE), or a low density polyethylene (LDPE) engaging the metal tube.

5. The method of claim 1, wherein the thermoplastic conduit includes a fire retardant material engaging the metal tube.

6. A method of making a multi-layer tubular conduit, the method comprising:
accessing a metal tube having an inside diameter, an outside diameter, a hermetically sealed length, an interior, and an exterior, wherein the exterior is longitudinally corrugated along the hermetically sealed length, wherein accessing comprises accessing a plurality of individual metal tubes, and orbitally welding together the individual metal tubes end-to-end such that the metal tube is formed;
positioning a thermoplastic conduit within the interior of the metal tube such that there are no intervening layers between the interior of the metal tube and the thermoplastic conduit, wherein the thermoplastic conduit having an inside diameter and an outside diameter less than the inside diameter of the metal tube, wherein the thermoplastic conduit is hollow, wherein the thermoplastic conduit includes a layer of friction-reducing material engaging the metal tube;
routing a signal cable within the thermoplastic conduit longitudinally such that contains only one bundle including the signal cable; and
surrounding the exterior of the metal tube with an overjacket such that the thermoplastic conduit, the metal tube, and the overjacket are coaxial to each other and such that there are no intervening layers between the exterior of the metal tube and the overjacket, wherein the overjacket having an outside diameter and an inside diameter greater than the outside diameter of the metal tube.

7. The method of claim 6, wherein the friction-reducing material includes a silicone polymer engaging the metal tube.

8. The method of claim 1, wherein the thermoplastic conduit has an outside diameter in a range of 2 millimeters to 15 inches.

9. The method of claim 1, wherein the thermoplastic conduit is colored with a colored dye before the positioning.

10. The method of claim 9, wherein the thermoplastic conduit includes at least one stripe of contrasting color before the positioning.

11. The method of claim 2, wherein the stainless steel is type 304 stainless steel.

12. The method of claim 1, further comprising:
extending the signal cable to a first length between 80 feet and 6,000 feet within the metal tube as the metal tube extends a second length between 80 feet to 6,000 feet based on the orbitally welding.

13. The method of claim 1, further comprising:
orbitally welding together the individual metal tubes end-to-end such that the metal tube extends to a length between 160 feet and 12,000 feet.

14. The method of claim 1, wherein the inside diameter of the metal tube is in a range of 2 millimeters to 15 inches.

15. The method of claim 1, wherein the outermost diameter of the metal tube is in a range of 2 millimeters to 15 inches.

16. The method of claim 1, wherein the overjacket has a thickness in a range of 0.05 inches to 0.10 inch.

17. The method of claim 1, wherein the overjacket has a thickness in a range of 0.06 inches to 0.08 inches.

18. The method of claim 1, wherein the overjacket has a thickness of 0.070 inches.

19. The method of claim 1, wherein the overjacket includes at least one of a Polyvinylchloride (PVC), a Polyethylene (PE), a Polyurethane, or a Nylon.

20. The method of claim 1, wherein the overjacket includes at least one of a high-density polyethylene (HDPE), a medium density polyethylene (MDPE), or a low density polyethylene (LDPE).

21. The method of claim 1, wherein the overjacket includes a fire retardant material.

22. The method of claim 21, wherein the fire retardant material includes at least one of a Low Smoke Zero Halogen (LSZH), a riser rated material, or a plenum rated material.

23. The method of claim 1, wherein the overjacket includes at least one of a Polyvinylidene Fluoride (PVDF) or a Low Smoke Zero Halogen (LSZH).

24. The method of claim 1, wherein the innermost diameter of the overjacket is in a range of 2 millimeters to 15 inches.

25. The method of claim 1, wherein the outside diameter of the overjacket is in a range of 2 millimeters to 15 inches.

26. The method of claim 1, wherein the orbitally welding comprises:
welding a pair of end portions of a pair of the metal tubes such that the pair of end portions forms a hermetic seal between the pair of metal tubes.

27. The method of claim 1, wherein the signal cable includes a fiber optic cable.

28. The method of claim 1, wherein the positioning the thermoplastic conduit within the interior of the metal tube comprises at least one of:
pushing the thermoplastic conduit into the metal tube as hermetically sealed,
pulling the thermoplastic conduit into the metal tube as hermetically sealed, or
propelling the thermoplastic conduit into the metal tube as hermetically sealed.

29. The method of claim 1, wherein the positioning the thermoplastic conduit within the interior of the metal tube comprises:
wrapping the metal tube around the thermoplastic conduit, and
welding the metal tube with another tube to form a hermetic seal.

30. The method of claim 29, wherein the wrapping comprises:
arranging the thermoplastic conduit within the metal tube, as hermetically sealed, coaxially such that the thermoplastic conduit and the metal tube share a common central axis.

* * * * *